US012591138B2

(12) United States Patent
You et al.

(10) Patent No.: US 12,591,138 B2
(45) Date of Patent: Mar. 31, 2026

(54) OPTICAL DEVICE FOR AR GLASSES

(71) Applicant: Fuzhou Photop Optics Co., Ltd.

(72) Inventors: Tyler You, Fuzhou (CN); Fadian Le, Fuzhou (CN); Jian Gao, Fuzhou (CN); Qiujie Zhang, Fuzhou (CN); Yulin Zhang, Fuzhou (CN)

(73) Assignee: Fuzhou Photop Optics Co., Ltd. (CN)

( * ) Notice: Subject to any disclaimer, the term of this patent is extended or adjusted under 35 U.S.C. 154(b) by 489 days.

(21) Appl. No.: 18/111,711

(22) Filed: Feb. 20, 2023

(65) Prior Publication Data

US 2024/0241376 A1 Jul. 18, 2024

(30) Foreign Application Priority Data

Jan. 17, 2023 (CN) .......................... 202310077661.3

(51) Int. Cl.
*G02B 27/01* (2006.01)
*G02B 27/10* (2006.01)

(52) U.S. Cl.
CPC ..... *G02B 27/0172* (2013.01); *G02B 27/1006* (2013.01); *G02B 2027/0178* (2013.01)

(58) Field of Classification Search
CPC ........... G02B 27/0172; G02B 27/1006; G02B 27/141; G02B 27/102; G02B 2027/0178
See application file for complete search history.

(56) References Cited

U.S. PATENT DOCUMENTS

2018/0074240 A1* 3/2018 Bonar ................ H10H 20/8513
2024/0402506 A1* 12/2024 Berner ................ H01S 5/4087

* cited by examiner

*Primary Examiner* — Nathanael R Briggs
(74) *Attorney, Agent, or Firm* — McAndrews, Held & Malloy, Ltd.

(57) ABSTRACT

A beam combining device, enabled to combine a first beam with a second beam of a different spectrum into a combined beam, where the combination may be obtained through a device comprising two antireflective coating, a dichroic filter coating, and a reflective coating arranged on a substrate.

19 Claims, 7 Drawing Sheets

OPTICAL DEVICE FOR AR GLASSES

CROSS-REFERENCE TO RELATED APPLICATION

This patent application claims priority to and the benefit from Chinese Patent Application CN 2023100776613 filed Jan. 17, 2023 at the Chinese National Intellectual Property Administration (CNIPA). The above application is incorporated by reference herein.

TECHNICAL FIELD

Disclosed herein are various physical configurations of an optical device for AR glasses.

BACKGROUND

Aspects of the present disclosure relate to an optical device for AR glasses. Various issues may exist with conventional solutions for AR glasses. In this regard, conventional systems and methods for AR glasses may be costly, cumbersome, and/or inefficient.

Limitations and disadvantages of conventional systems and methods will become apparent to one of skill in the art, through comparison of such approaches with some aspects of the present methods and systems set forth in the remainder of this disclosure with reference to the drawings.

BRIEF SUMMARY OF THE DISCLOSURE

Shown in and/or described in connection with at least one of the figures, and set forth more completely in the claims is an optical device for AR glasses.

These and other advantages, aspects and novel features of the present disclosure, as well as details of illustrated embodiments thereof, will be more fully understood from the following description and drawings.

BRIEF DESCRIPTION OF THE DRAWINGS

The various features and advantages of the present disclosure may be more readily understood with reference to the following detailed description taken in conjunction with the accompanying drawings, wherein like reference numerals designate like structural elements.

DESCRIPTION

Figure 1:
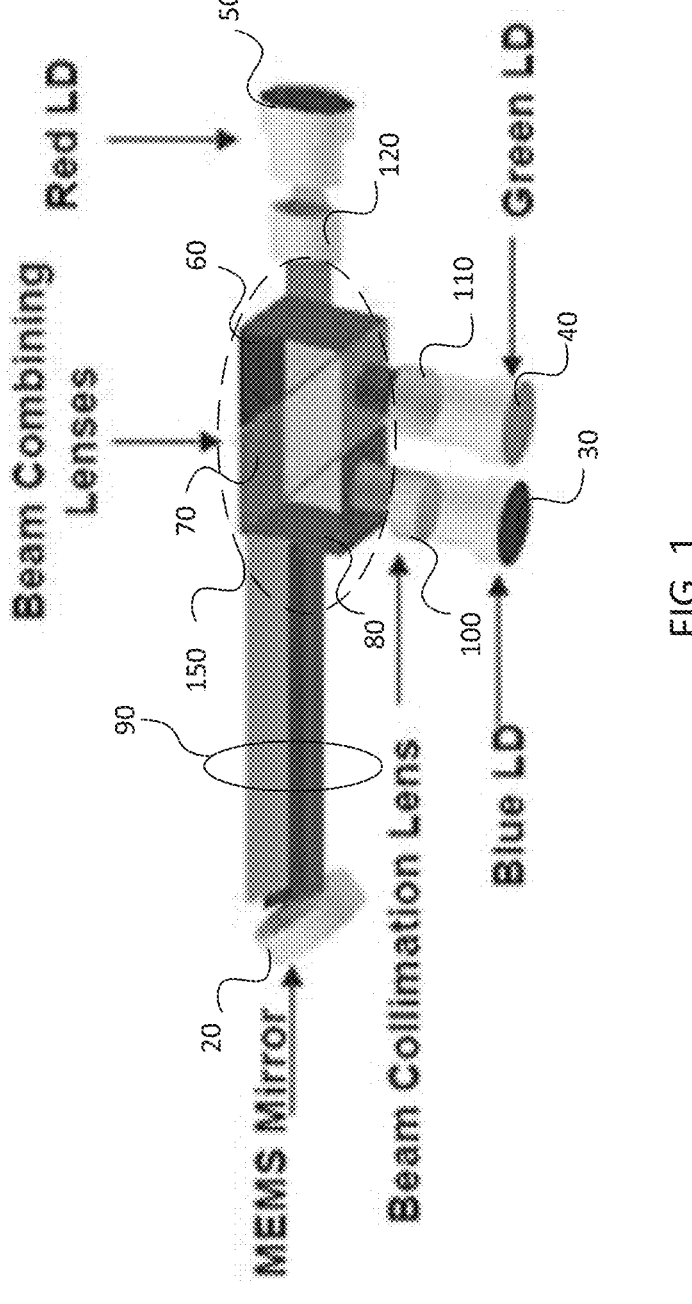
FIG. 1 shows an exemplary laser beam scanning system.

The following discussion provides various examples of an optical device for AR glasses. Such examples are non-limiting, and the scope of the appended claims should not be limited to the particular examples disclosed. In the following discussion, the terms "example" and "e.g." are non-limiting.

The figures illustrate the general manner of construction, and descriptions and details of well-known features and techniques may be omitted to avoid unnecessarily obscuring the present disclosure. In addition, elements in the drawing figures are not necessarily drawn to scale. For example, the dimensions of some of the elements in the figures may be exaggerated relative to other elements to help improve understanding of the examples discussed in the present disclosure. The same reference numerals in different figures denote the same elements.

The term "or" means any one or more of the items in the list joined by "or". As an example, "x or y" means any element of the three-element set $\{(x), (y), (x, y)\}$. As another example, "x, y, or z" means any element of the seven-element set $\{(x), (y), (z), (x, y), (x, z), (y, z), (x, y, z)\}$.

The terms "comprises," "comprising," "includes," and/or "including," are "open ended" terms and specify the presence of stated features, but do not preclude the presence or addition of one or more other features.

The terms "first," "second," etc. may be used herein to describe various elements, and these elements should not be limited by these terms. These terms are only used to distinguish one element from another. Thus, for example, a first element discussed in this disclosure could be termed a second element without departing from the teachings of the present disclosure.

Unless specified otherwise, the term "coupled" may be used to describe two elements directly contacting each other or describe two elements indirectly connected by one or more other elements. For example, if element A is coupled to element B, then element A can be directly contacting element B or indirectly connected to element B by an intervening element C. Similarly, the terms "over" or "on" may be used to describe two elements directly contacting each other or describe two elements indirectly connected by one or more other elements.

FIG. 1 shows an exemplary laser beam scanning system 10. The laser beam scanning system 10 may comprise a blue laser diode 30, a green laser diode 40, and a red laser diode 50. The laser diodes 30, 40, 50 may be operable to generate light of a wavelength corresponding to their respective color, e.g., the blue laser diode 30 may generate blue light. The light generated from laser diodes 30, 40, 50 may be directed towards corresponding collimating lenses 100, 110, 120. Collimating lenses 100, 110, 120 may be operable to make light rays entering the collimating lens more parallel, thus reducing the light divergence at their output. There is further shown a beam combining lens 150 comprising prisms 60, 70, 80. The beam combining lens 150 may be obtained by gluing together glass prisms 60, 70, 80. The glass prisms 60, 70, 80 may be made from glass, for example. The beam combining lens 150 may be enabled to combine light beams entering the prisms 60, 70, 80. By combining a red light beam generated at the red laser diode 50 with a green light beam generated at the green laser diode 40, and a blue light beam generated at the blue laser diode 30, the beam combining lens 150 may generate a combined beam 90 from an RGB color space. There is further illustrated micro-electro-mechanical system (MEMS) mirror 20. A MEMS mirror 20 may be enabled to move a mirror in response to electromechanical forces. When a combined beam 90 is directed onto a MEMS mirror 20, the combined beam 90 may be deflected to a desirable position by moving the MEMS mirror 20 accordingly. For example, in laser beam scanning system 10, the MEMS mirror 20 may move rapidly, so that the combined beam 90 may move over a projection surface (not shown) at a rate that may so fast as to generate an image that appears stationary to the human eye.

In augmented reality (AR) applications, a laser beam scanning system 10 may be used to project an image onto AR glasses that a person may wear. It is desirable for AR glasses to be lightweight and of a miniaturized design. This may increase the comfort to the human wearer and improve the human-machine experience. Furthermore, it is desirable for AR glasses to be power efficient.

Figure 2:
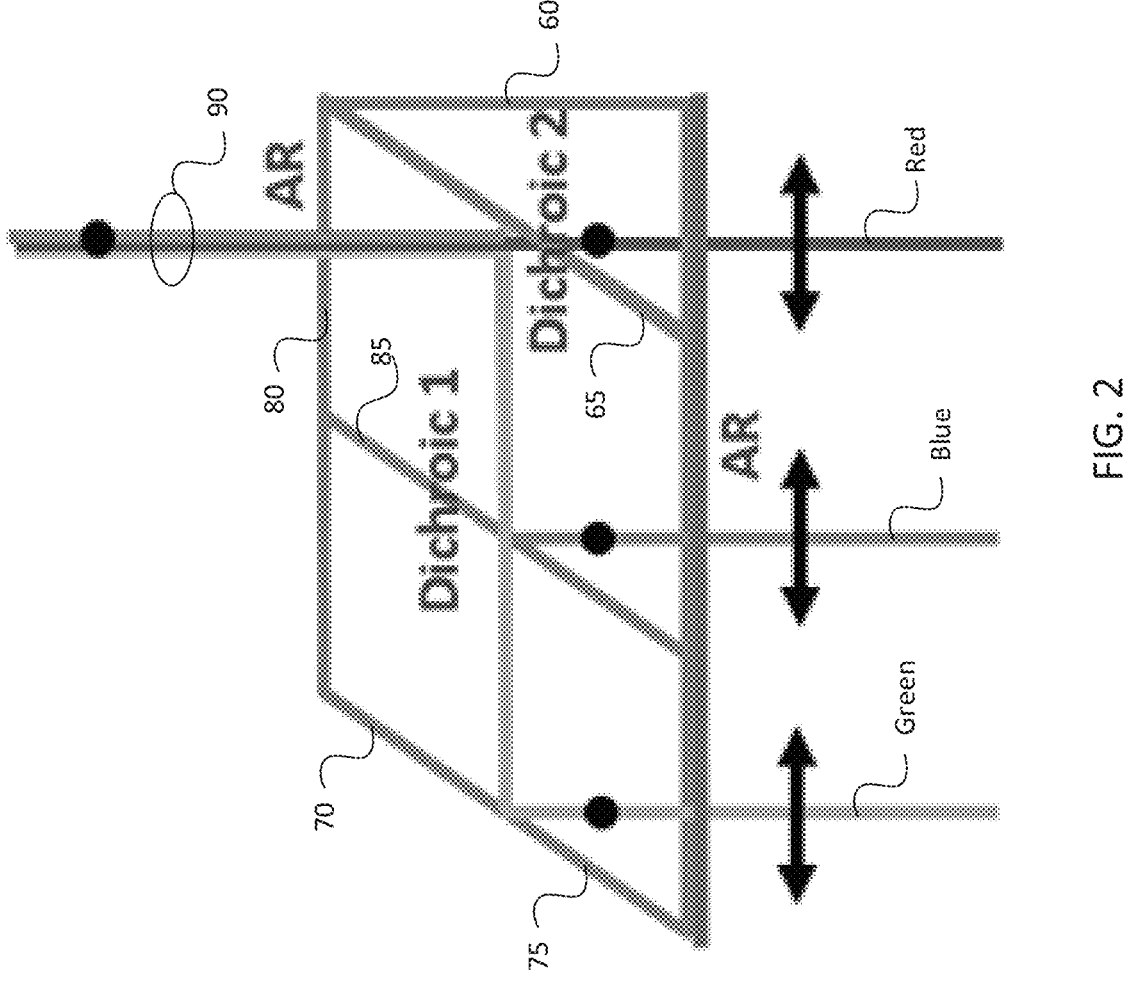
FIG. 2 depicts an alternative beam combining lens.

FIG. 2 depicts an alternative beam combining lens 150. While FIG. 1 may illustrate an exemplary beam combining lens 150 where the blue light and green light entering the beam combining lens 150 are substantially parallel and the red light entering the beam combining lens 150 is at a right angle to the blue and the green light beams, FIG. 2 illustrates a beam combining lens 150 where the red, blue, and red light beams are parallel, i.e. entering from the substantially same direction.

There are shown prisms 60, 70, 80, where prism 60 may be associated with the red laser beam, prism 70 may be associated with the green laser beam, and prism 80 may be associated with the blue laser beam. There is also indicated a dichroic filter 1 between prism 70 and prism 80, and a dichroic filter 2 between prism 80 and prism 60. A dichroic filter 1 and dichroic filter 2 may be thin-film filters that may be enabled to pass light of a small range of colors, while reflecting other colors. Dichroic filters 1, 2 may use the principle of thin film interference. The thin film of dichroic filter 1 and dichroic filter 2 may be generated through the deposition of optical coatings on surfaces of the prism 70, 80, and/or 60 surfaces. There are further shown prism surface 75, 85, 65. There are also shown anti-reflective coating labelled AR. The antireflective coatings may be operable to permit the passage of RGB light.

Prism 70, associated with a green laser beam, may be operable such that a green laser beam entering the prism as illustrated may be reflected on prism surface 75 towards prism surface 85. The dichroic filter 1 on the surface 85 between prism 70 and prism 80 may be operable to let green light pass through. Prism 80 associated with a blue laser beam, may be operable such that a blue laser beam entering the prism 80 as illustrated may be reflected on prism surface 85 towards prism surface 65. Thus, the green light and the blue light may be combined and prism 80 and are directed towards prism surface 65. Prism 60 may be operable such that a red laser entering the prism may pass through prism surface 65 and prism 80. The dichroic filter 2 may be operable such that it lets red light from prism 60 pass through, while reflecting green light and blue light reaching it through prism 80. As illustrated, the red light from prism 60 may combine with the green light and the blue light from prism 80 on the dichroic filter 2. The combined beam 90 may exit the beam combining lens 150 on the illustrated top surface of prism 80.

Figure 3:
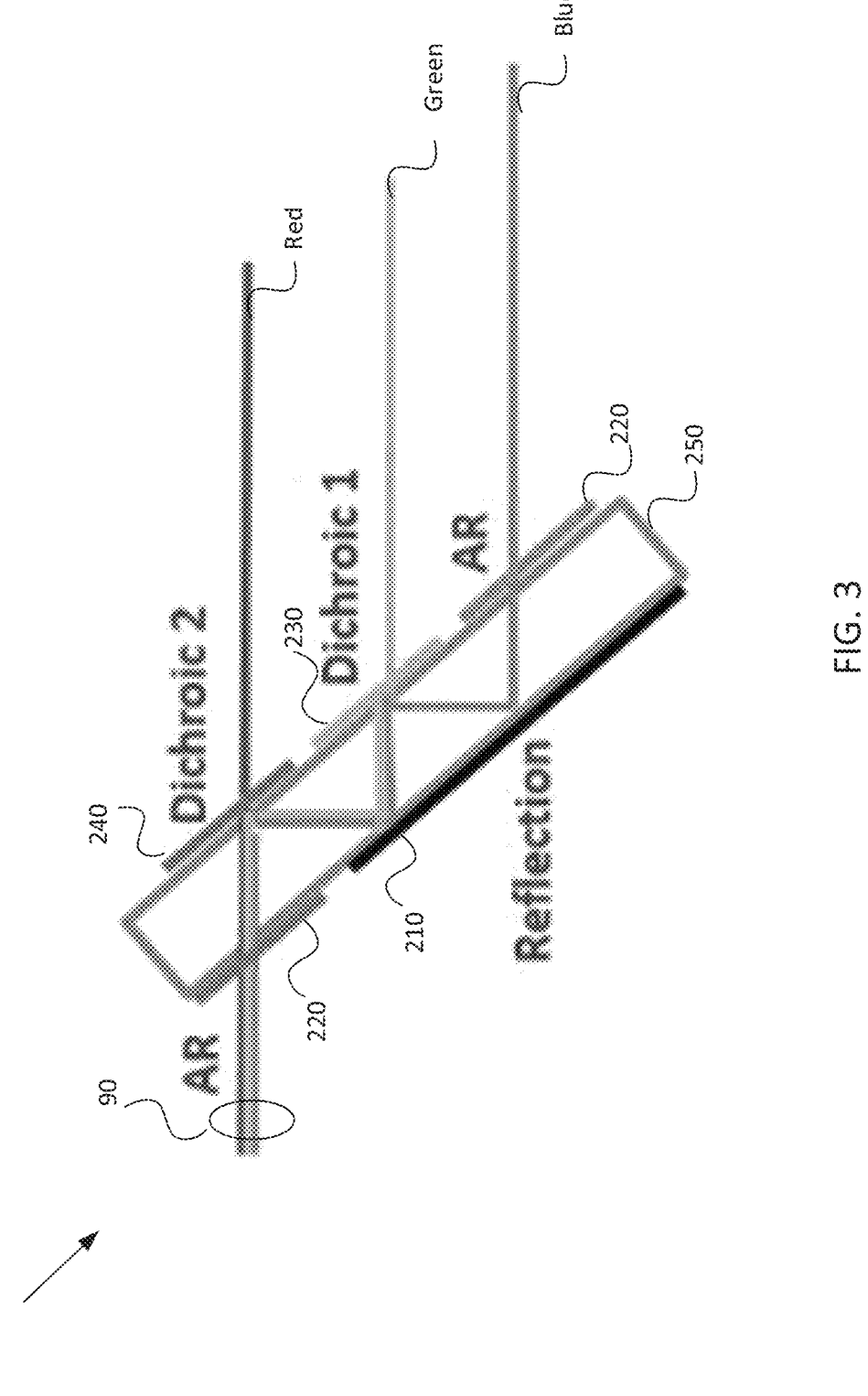
FIGS. 3-7 depict exemplary beam combining lenses.

FIG. 3 depicts an exemplary beam combining lens 200. The beam combining lens 200 may comprise a substrate 250, a reflective coating 210, antireflective coatings 220, a combined beam 90, and dichroic filters 230, 240. There are also shown a blue light beam, a green light beam, and a red light beam. In contrast to FIGS. 1 and 2, the embodiment of FIG. 3 uses a substrate 250 instead of three prisms. The substrate 250 may be made of glass or another suitable medium that may permit RGB light to pass. The optical coatings 210, 220, 230, 240 may be deposited on a substrate 250 using photolithography. Photolithography may be highly precise, making the approach suitable for miniaturization. Also, it may be desirable to use a single substrate 250 instead of multiple prisms that may need to be bonded together.

The antireflective coatings 220 may be operable to pass RGB light. The reflective coating 210 may be operable to reflect RGB light. The dichroic filter 230 may be operable to reflect blue light and to let green light pass. The dichroic filter 240 may be operable to reflect green and blue light and to let red light pass.

For the beam combining lens 200, a blue laser beam may enter a glass substrate 250 via the antireflective coating 220. The blue light beam may be reflected on the reflective coating 210 towards the dichroic filter 230. The green light beam may be directed towards the dichroic filter 230. Because the dichroic filter 230 may let green light pass, the green light beam will pass through dichroic filter 230 into the substrate 250, towards the reflective coating 210. Correspondingly, the blue light beam and the green light beam may combine in the substrate 250 at the dichroic filter 230. The combined green and blue light beam may then be reflected on the reflective coating 210 towards the dichroic filter 240. The red light beam may be directed towards the dichroic filter 240. Because the dichroic filter 240 may let red light pass, the red light beam will pass dichroic filter 240 into the substrate 250. The combined blue and green light beams from reflective coating 210 may combine with the red light beam at the dichroic filter 240, where the blue and green light beams may be reflected towards antireflective coating 220. Correspondingly, the red, green, and blue light may combine at the dichroic filter 240 to form a combined beam 90. The combined beam 90 made then pass through substrate 250 and the antireflective coating 220, and exit the beam combining lens 200.

Because of the high precision of lithography, beam combining lenses 200 may be highly miniaturized. Correspondingly, such devices may be conducive to the miniaturization of AR technology. Furthermore, lithography may be desirable to produce many such products on a same wafer, which may greatly improve production efficiency and reduce manufacturing cost.

Figure 4:
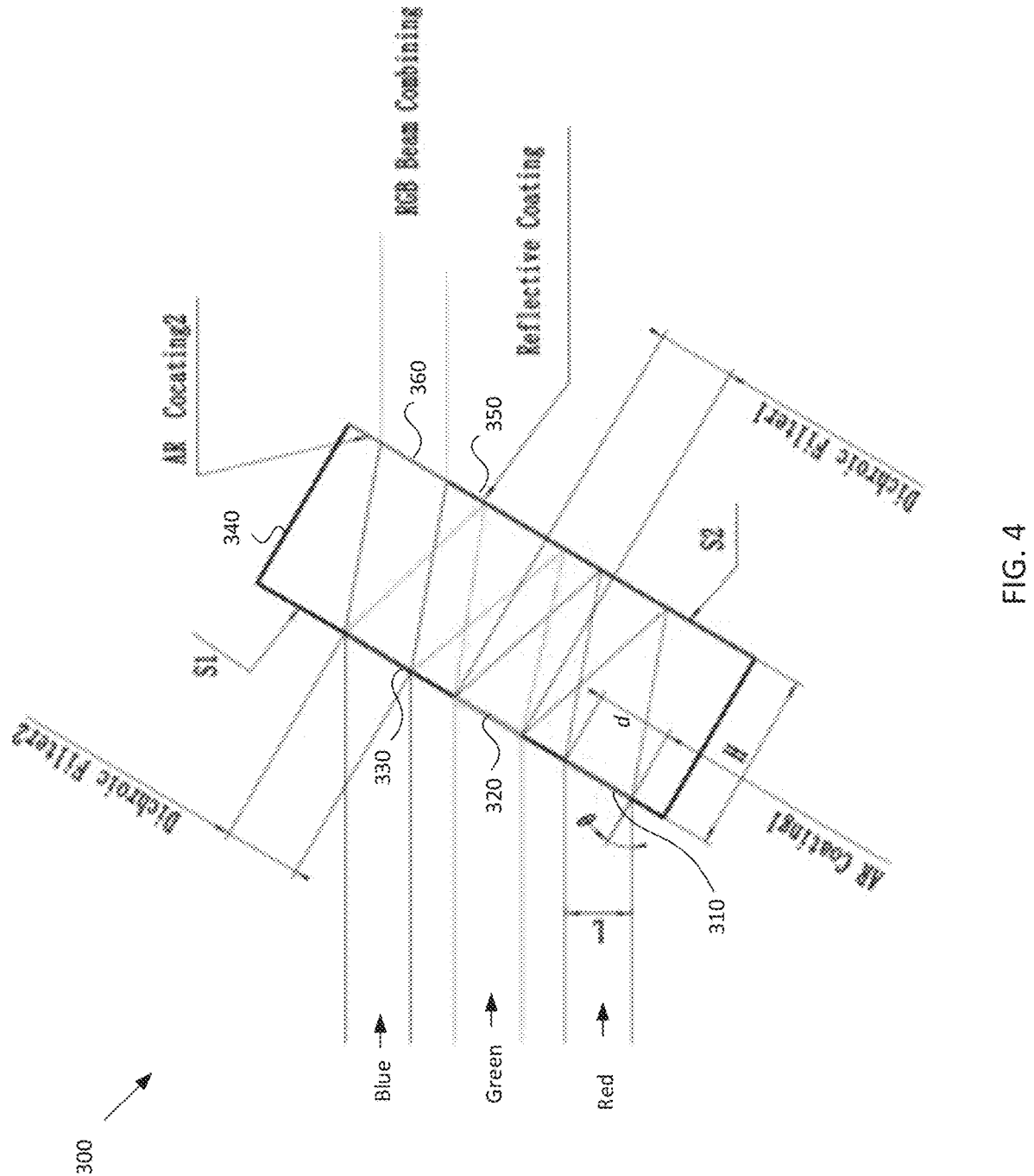

FIG. 4 depicts an exemplary beam combining lens 300. There is shown a substrate 340 comprising a surface S1 and a surface S2. The surfaces S1 and S2 may be substantially parallel. The substrate 340 may possess thickness H. The substrate 340 may be enabled to receive photolithographic optical coatings on the surfaces S1 and S2. For example, the substrate 340 may be made of glass. The glass used for substrate 340 may be borosilicate glass, including but not limited to K9 and other glass materials.

There is shown an antireflective coating 310, a dichroic filter 320, and a dichroic filter 330, deposited on the surface S1. The antireflective coating 310 may be antireflective for a spectrum of red light. The dichroic filter 320 may be antireflective for a spectrum of green light, and reflective for a spectrum of red light. The dichroic filter 330 may be antireflective for a spectrum of blue light, and reflective for a spectrum of red and green light. In accordance with various embodiments of the disclosure, the reflectivity and/or transmittivity of the various optical coatings may be greater than 98%.

On the surface S2, there is also shown a reflective coating 350. The reflective coating 350 may be reflective for a spectrum of red, green and blue light. There is further shown an antireflective coating 360 on surface S2. The antireflective coating 360 may be antireflective for a spectrum of red, green, and blue light.

There are further shown a red light beam, a green light beam, and the blue light beam, entering the beam combining device 300 through antireflective coating 310, dichroic filter 320, and dichroic filter 330, respectively. A combined red, green and blue beam is shown to exit the beam combining device 300 through the antireflective coating 360. There is shown an approximate width of the red light beam L, and an incident angle θ between the red light beam at the beam combining device 300, specifically with respect to the surface S1. The green and blue light beams may be incident to the beam combining device 300 at approximately the same angle θ, and be of approximately similar width L. There is also shown a coating distance d, that is, a coating length of the antireflective coating 310 on surface S1. The minimum coating distance d may be L/cos (θ). The coating length of the dichroic filter 320 and the dichroic filter 330 on surface S1 may be also approximately d, provided their respective width is also approximately L. The green light beam and blue light beam angle of incidence may be also approximately θ.

The combining of the RGB beam may be achieved as follows: a red light beam enters the beam combining device 300 through antireflective coating 310. The red light beam is then reflected on the reflective coating 350 on the surface S2 toward the dichroic filter 320, where the red light beam is reflected again towards reflective coating 350. The green light beam enters the beam combining device 300 at the dichroic filter 320, where the green light beam combines with the red light beam that is being reflected at dichroic filter 320. The green and red light (combined) beam then travels to the reflective coating 350 where it is reflected toward the dichroic filter 330. The green and red light beam is then reflected at the dichroic filter 330 on the surface S1. The blue light beam enters the beam combining device 300 at the dichroic filter 330, where it combines with the previously combined red and green beam, to form an RGB beam. The RGB beam exits the beam combining device 300 through antireflective coating 360 on surface S2.

Figure 5:
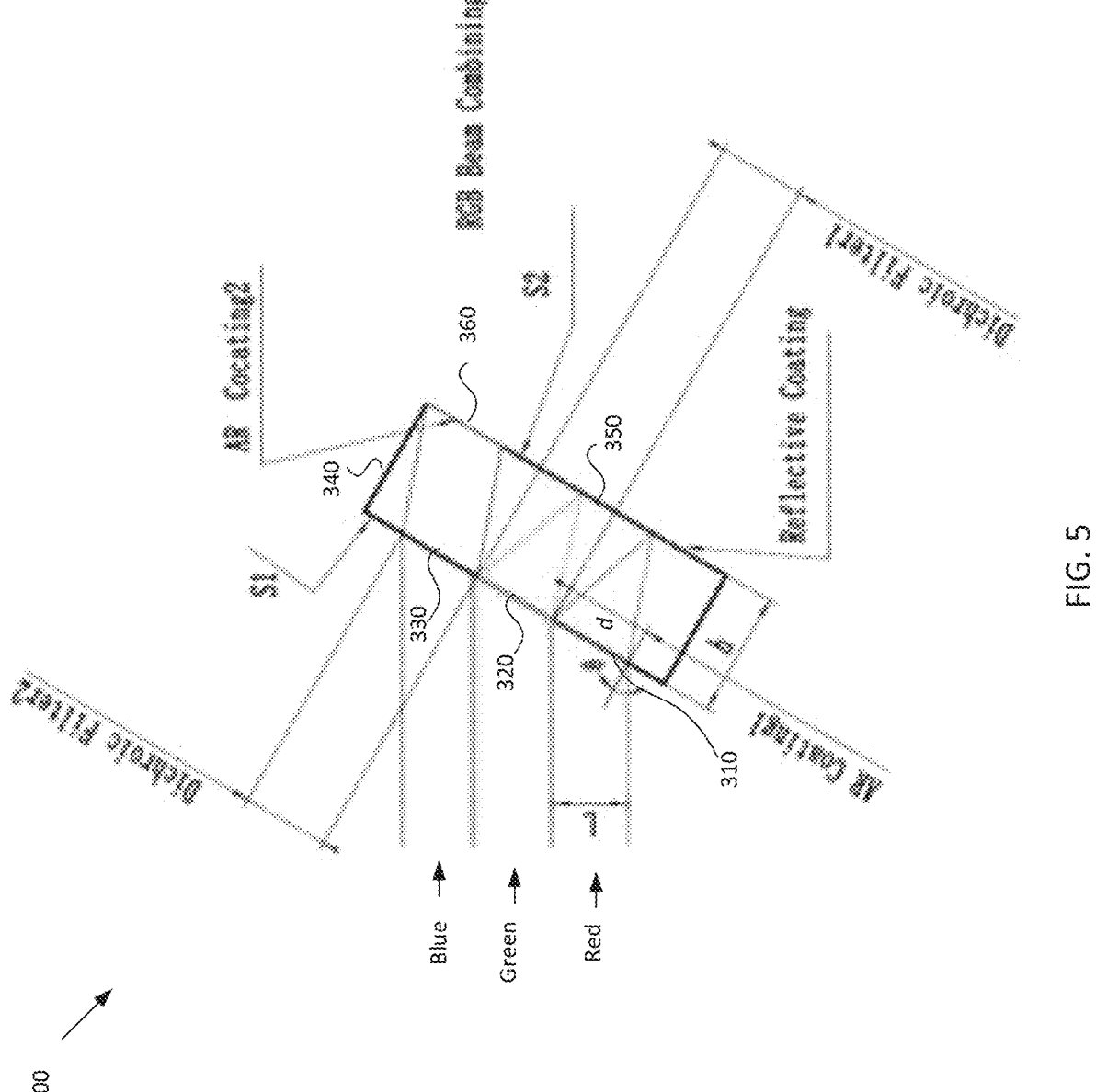

FIG. 5 depicts an exemplary embodiment of beam combining device 300. The elements of FIG. 5 with the same reference numerals may depict the same elements as illustrated in FIG. 4. In FIG. 5, the red light beam, the green light beam, and blue light beam may be directly adjacent to each other. In this case, the thickness of the glass may be reduced and h, the thickness of substrate 340, may be equal to L/(2 sin (θ)), for example.

In practical applications, the thickness of the substrate 340 may be flexibly designed according to the size of the product package structure. In such cases, the optical index of the device may be satisfied by changing the distance between the optical function films. The deposition size d of optical films may be determined by the laser spot size, the incident angle, and the glass thickness.

Figure 6:
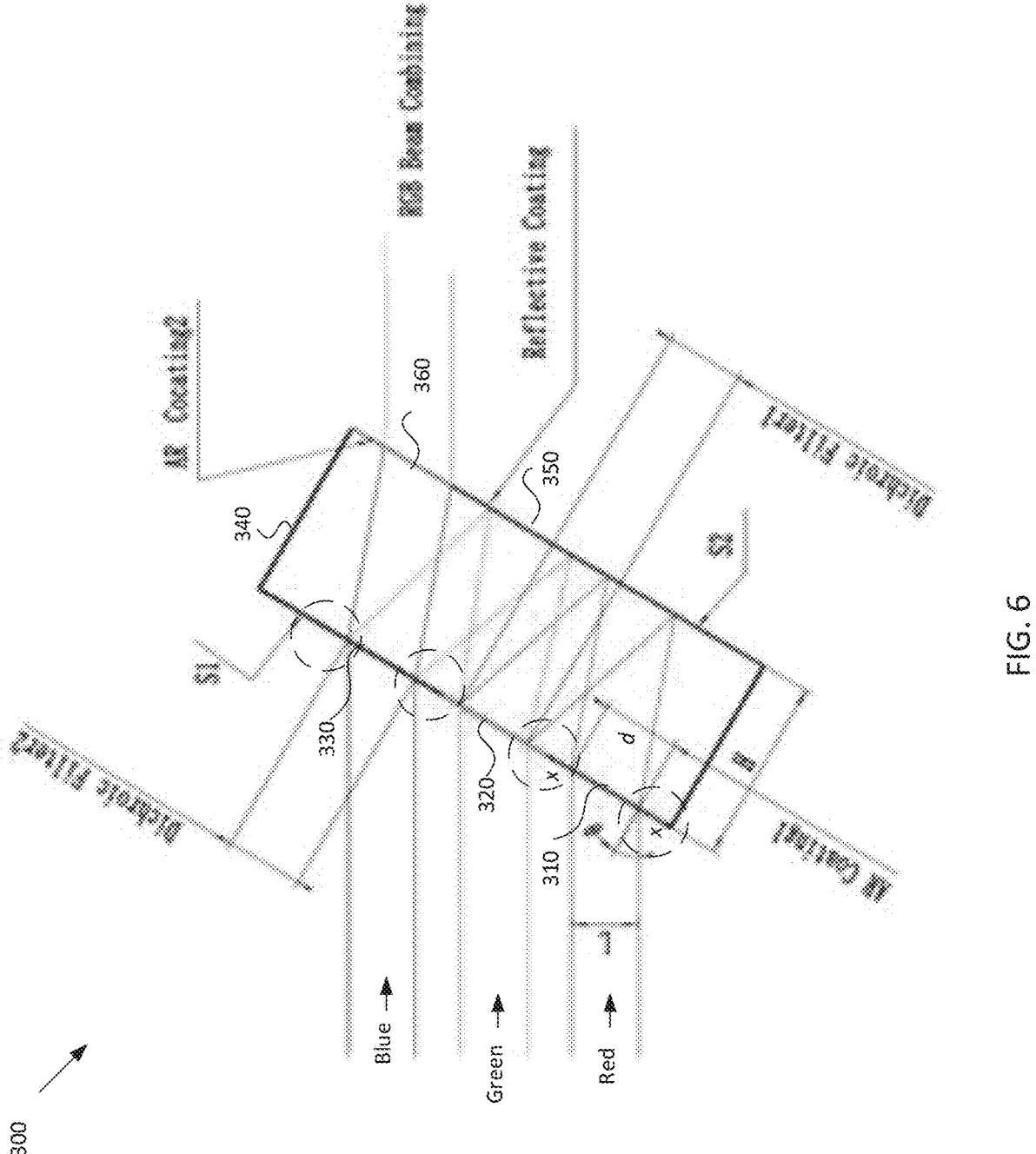

FIG. 6 depicts an exemplary embodiment of beam combining device 300. The elements of FIG. 6 with the same reference numerals may depict the same elements as illustrated in FIG. 5. In practical applications, it may be desirable that the red light beam, the green light beam, and the blue light beam may not be directly adjacent, so as to allow and compensate for imprecisions and errors in the deposition of the optical coating films (e.g. 310, 320, 330, 360, 350) on the substrate 340. In some instances, there may be slight errors in the position of the optical coatings 310, 320 and 330, for example. To improve accuracy and effective use of incident light, the coating size on the surface S1, for example, may be enlarged slightly. For example, the antireflective coating 310 may be extended by a distance x on either side of the minimum required coating distance d, to account for errors and inaccuracies of the coating process. Similarly, the dichroic filter 320 and the dichroic filter 330 may be coated onto surface S1 slightly longer than d, as strictly required necessary by the light beam width L, as illustrated in the dashed circles.

Figure 7:
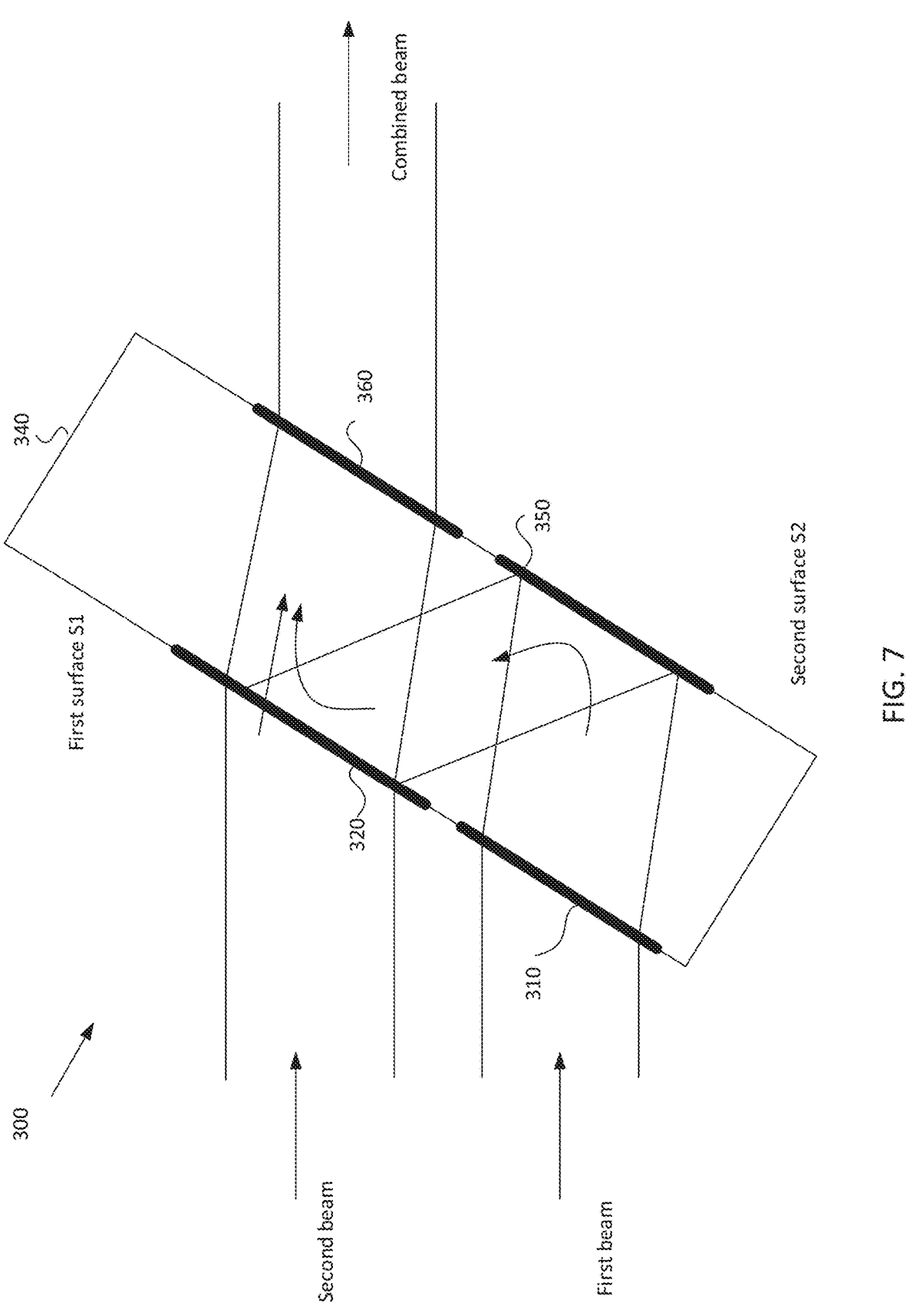

FIG. 7 depicts an exemplary embodiment of beam combining device 300. There is shown a substrate 340 comprising a first surface S1 and a second surface S2. The first surface S1 and the second surface S2 may be substantially parallel. There is further shown a first antireflective coating 310 and a first dichroic filter 320 on the first surface S1. There is shown a reflective coating 350 and a second antireflective coating 360 on the second surface. There is shown a first beam and a second beam entering the beam combination device 300 through the antireflective coating 310 and the dichroic filter 320, respectively. A combined beam formed from the combination of the first beam and the second beam is shown exiting the beam combination device 300 through the second antireflective coating 360. The first antireflective coating 310 may be antireflective to the spectrum of a first beam. The reflective coating 350 may be reflective to a spectrum of the first beam. The dichroic filter 320 may be reflective to the spectrum of the first beam and transmissive to the spectrum of the second beam. The second antireflective coating 360 may be transmissive to the spectra of both the first beam and the second beam. It may not be necessary that the spectrum of the first beam and/or the second beam are a single color/wavelength, it may suffice that the spectra of the first beam and second beam are non-overlapping.

Referring to FIG. 7, the principal illustrated in FIGS. 3-6 may be generalized to any number of beams of different spectra, not just red, green, and blue, as will be understood to the person skilled in the art. Specifically, a first beam may enter the beam combination device 300 through the first antireflective coating 310, which may be antireflective to a spectrum of the first beam. The first beam may then travel to the reflective coating 350, from where it may be reflected to the dichroic filter 320. The first beam may be reflected on the dichroic filter 320 and combine with the second beam entering the beam combination device 300 through dichroic filter 320 to form a combined beam that may exit the beam combining device 300 through second antireflective coating 360.

As will be clear to the person skilled in the art, and as was shown in the FIGS. 3-6, on the example of combining red, green and blue light beams, the principle illustrated in FIG. 7 may be extended to the combination of any number of beams, by selecting desirable reflectivity and/or transmissivity of the antireflective coatings and/or dichroic filters applied to the first surface and the second surface of the substrate 340. In those cases, the dichroic filters may be operable to reflect the spectrum of previously combined beams and pass the spectrum of the beam entering the beam combining device 300 at that location. Correspondingly, any number of beams comprising a different spectrum/color may be combined in a similar fashion.

The present disclosure includes reference to certain examples, however, it will be understood by those skilled in the art that various changes may be made and equivalents may be substituted without departing from the scope of the disclosure. In addition, modifications may be made to the disclosed examples without departing from the scope of the present disclosure. Therefore, it is intended that the present disclosure not be limited to the examples disclosed, but that the disclosure will include all examples falling within the scope of the appended claims.

What is claimed is:

1. A beam combining device, enabled to combine a first beam with a second beam of a different spectrum into a combined beam, said beam combining device comprising:
   a single-piece substrate comprising a first surface and a second surface, said first surface and said second surface being substantially parallel;
   a first antireflective coating patterned laterally on said first surface, said first antireflective surface being antireflective to a spectrum of a first beam;
   a dichroic filter coating patterned laterally on said first surface, said dichroic filter coating being antireflective to a spectrum of said second beam, and said dichroic filter coating being reflective to said spectrum of said first beam;

a continuous reflective coating on said second surface, said reflective surface being reflective to said spectrum of said first beam; and a second antireflective coating on said second surface, said second antireflective surface coating being antireflective to a spectrum of said combined beam, wherein:

said spectrum of said combined beam combines said spectra of said first beam and said second beam, the first beam and the second beam are each incident on the first surface at substantially a same angle $\theta$ and have substantially a same width L, the first antireflective coating and the dichroic filter coating define non-overlapping lateral regions on the first surface, each having a coating length$\geq$L/cos $(\theta)$, the substrate has a thickness h=L/(2·sin $(\theta)$) when the first and second beams are substantially adjacent on the first surface, the first beam reflects from the reflective coating on the second surface toward the dichroic filter coating to combine with the second beam at the dichroic filter coating, and the combined beam exits the device through the second antireflective coating on the second surface.

2. The beam combining device of claim 1, wherein said substrate may be made of glass or borosilicate glass or K9 glass.

3. The beam combining device of claim 1, wherein said first antireflective coating and/or said second antireflective coating and/or said dichroic filter coating and/or said reflective coating may be applied to said first surface and/or said second surface by photolithography.

4. The beam combining device of claim 1, wherein the spectrum of the first beam is non-overlapping with the spectrum of the second beam.

5. The beam combining device of claim 1, comprising N additional dichroic filters on said first surface to combine N additional beams with said first beam and said second beam.

6. The beam combining device of claim 5, wherein each of said N additional dichroic filters is transmissive to a beam spectrum of an additional beam entering the beam combining device at said additional dichroic filter, and reflective to the spectrum of the combined spectrum of the beams incident from said reflective coating on said second surface.

7. The beam combining device of claim 5, wherein N=1 and said first beam, second beam, and third beam may be from the set of a red beam, a green beam, and a blue beam.

8. The beam combining device of claim 1, wherein said first beam and said second beam are both of a same width L.

9. The beam combining device of claim 1, wherein said first beam and said second beam are substantially adjacent.

10. The beam combining device of claim 1, wherein said first antireflective coating and said dichroic filter coating have dimension/coating distance greater than L/cos $(\theta)$, where $\theta$ is the angle of incidence.

11. A method to generate a beam combining device using a substrate comprising a first surface and a second surface, said first surface and said second surface being substantially parallel, and said beam combining device enabled to combine a first beam with a second beam of a different spectrum into a combined beam, said method comprising:

depositing a first antireflective coating on said first surface, said first antireflective surface being antireflective to a spectrum of a first beam;

depositing a dichroic filter coating on said first surface, said dichroic filter coating being antireflective to a spectrum of said second beam, and said dichroic filter coating being reflective to said spectrum of said first beam;

depositing a reflective coating on said second surface, said reflective surface being reflective to said spectrum of said first beam; and depositing a second antireflective coating on said second surface, said second antireflective surface coating being antireflective to a spectrum of said combined beam, wherein:

said spectrum of said combined beam combines said spectra of said first beam and said second beam, the first beam and the second beam are each incident on the first surface at substantially a same angle $\theta$ and have substantially a same width L, the first antireflective coating and the dichroic filter coating define non-overlapping lateral regions on the first surface, each having a coating length$\geq$L/cos $(\theta)$, the substrate has a thickness h=L/(2·sin $(\theta)$) when the first and second beams are substantially adjacent on the first surface, the first beam reflects from the reflective coating on the second surface toward the dichroic filter coating to combine with the second beam at the dichroic filter coating, and the combined beam exits the device through the second antireflective coating on the second surface.

12. The method of claim 11, wherein said depositing is a photolithographic process.

13. The method of claim 11, wherein the spectrum of said first beam is non-overlapping with the spectrum of said second beam.

14. The method of claim 11, comprising depositing N additional dichroic filters on said first surface to combine N additional beams with said first beam and said second beam.

15. The method according to claim 14, wherein each of said N additional dichroic filters is transmissive to a beam spectrum of an additional beam entering the beam combining device at said additional dichroic filter, and reflective to the spectrum of the combined spectrum of the beams incident from said reflective coating on said second surface.

16. The method according to claim 15, wherein N=1 and said deposited first antireflective coating, said first dichroic filter, and said additional dichroic filter may be adapted to the set of a red beam, a green beam, and a blue beam.

17. The method according to claim 11, wherein said depositing is adapted to a first beam width and a second beam width of the same width L.

18. The method according to claim 11, wherein said first antireflective coating and said first dichroic filter are suitably deposited for said first beam and said second beam to be substantially adjacent.

19. The method according to claim 11, wherein said first antireflective coating and said dichroic filter coating are deposited with dimension/coating distance greater than L/cos $(\theta)$, where $\theta$ is the angle of incidence.

* * * * *